(12) United States Patent
Beer et al.

(10) Patent No.: US 8,919,678 B2
(45) Date of Patent: Dec. 30, 2014

(54) FILTRATION AND CLEANING SYSTEM FOR SPRINKLER IRRIGATION DROP NOZZLES

(75) Inventors: Gerald Beer, Guymon, OK (US); Michael Woodford Freitas, Colleyville, TX (US)

(73) Assignee: American Agriculture Products, LLC, Guymon, OK (US)

( * ) Notice: Subject to any disclaimer, the term of this patent is extended or adjusted under 35 U.S.C. 154(b) by 1121 days.

(21) Appl. No.: 12/538,291

(22) Filed: Aug. 10, 2009

(65) Prior Publication Data

US 2009/0294341 A1    Dec. 3, 2009

Related U.S. Application Data

(63) Continuation-in-part of application No. 11/697,781, filed on Apr. 9, 2007, now Pat. No. 7,900,854.

(60) Provisional application No. 60/745,069, filed on Apr. 18, 2006.

(51) Int. Cl.
| | |
|---|---|
| B05B 1/14 | (2006.01) |
| A01G 25/02 | (2006.01) |
| B05B 15/00 | (2006.01) |
| B05B 15/02 | (2006.01) |
| A01G 25/09 | (2006.01) |
| A62C 35/68 | (2006.01) |
| B05B 1/20 | (2006.01) |
| B05B 3/18 | (2006.01) |

(52) U.S. Cl.
CPC ............ *A01G 25/023* (2013.01); *B05B 15/008* (2013.01); *B05B 15/0208* (2013.01); *A01G 25/092* (2013.01); *A62C 35/68* (2013.01); *B05B 1/20* (2013.01); *B05B 3/18* (2013.01)
USPC ........................... 239/590; 239/575; 239/553

(58) Field of Classification Search
CPC .. B05B 15/008; B01D 29/114; B01D 35/147; B01D 35/1475; B01D 35/16
USPC ........... 239/589, 590, 590.3, 590.5, 575, 553, 239/110, 120; 210/136, 409, 446; 251/318, 251/319, 339; 285/95
See application file for complete search history.

(56) References Cited

U.S. PATENT DOCUMENTS

| | | | |
|---|---|---|---|
| 1,265,754 A * | 5/1918 | Deem | ........................... 239/110 |
| 1,508,480 A | 9/1924 | Skinner | |
| 2,770,498 A | 11/1956 | Filliung et al. | |
| 3,782,640 A | 1/1974 | Kirschmann | |
| 3,820,758 A | 6/1974 | Berg, Jr. et al. | |
| 4,061,873 A | 12/1977 | Berg, Jr. et al. | |

(Continued)

*Primary Examiner* — Len Tran
*Assistant Examiner* — Viet Le
(74) *Attorney, Agent, or Firm* — Abel Law Group, LLP

(57) ABSTRACT

A filter for use with overhead sprinkler irrigation systems is disclosed. The filter includes a body, a removable screen, and a manually-actuated plunger adjacent the screen. A water hammer table is partitioned in the body and located above the plunger. The plunger is positioned for reciprocal movement through a debris outlet between an open, debris-discharging position, and a closed filtering position. The plunger defaults to the closed filtering position by pressurized water flowing through the body. The water is simultaneously filtered through the screen and passes out a clean water outlet while debris accumulates within the body. The plunger may be manually retracted to the open, debris-discharging position at any time, whereby accumulated debris is flushed out of the body through the debris outlet by residual water flowing therethrough.

17 Claims, 7 Drawing Sheets

(56) References Cited

U.S. PATENT DOCUMENTS

| | | | |
|---|---|---|---|
| 4,064,046 A | 12/1977 | Gilger | |
| 4,077,611 A | 3/1978 | Wilson | |
| 4,081,171 A * | 3/1978 | Morgan et al. | 251/30.02 |
| D248,851 S | 8/1978 | Langlie et al. | |
| 4,512,955 A * | 4/1985 | Etani | 422/266 |
| 4,699,321 A | 10/1987 | Bivens et al. | |
| 4,717,073 A | 1/1988 | Bielka | |
| 5,004,157 A | 4/1991 | Martell | |
| 5,087,355 A * | 2/1992 | Godec | 210/136 |
| 5,267,695 A * | 12/1993 | Thayer | 239/566 |
| 5,685,486 A | 11/1997 | Spenser | |
| 5,709,343 A * | 1/1998 | Myers | 239/730 |
| 5,863,443 A | 1/1999 | Mainwaring | |
| 6,353,187 B1 | 3/2002 | Wilson, Jr. | |
| 6,382,525 B1 * | 5/2002 | Santiesteban et al. | 239/222.11 |
| 6,563,055 B1 | 5/2003 | Burdick | |
| 6,575,307 B2 | 6/2003 | Lockwood | |
| 6,583,363 B1 | 6/2003 | Wilson, Jr. | |
| D481,101 S | 10/2003 | Boehrs et al. | |
| D497,972 S | 11/2004 | Reynolds et al. | |
| 6,883,727 B2 | 4/2005 | De Los Santos | |
| 7,032,834 B1 * | 4/2006 | Anderson et al. | 239/104 |
| 7,900,854 B2 * | 3/2011 | Beer | 239/590 |
| 2007/0241214 A1 * | 10/2007 | Beer | 239/590 |

* cited by examiner

FILTRATION AND CLEANING SYSTEM FOR SPRINKLER IRRIGATION DROP NOZZLES

This application claims priority to and the benefit of U.S. Provisional Patent App. No. 60/745,069, filed on Apr. 18, 2006, and also incorporates U.S. Pat. No. 5,087,355 by reference. This application is a continuation-in-part of and claims priority from U.S. patent application Ser. No. 11/697,781, filed on Apr. 9, 2007, which application is incorporated by reference herein in its entirety.

BACKGROUND OF THE INVENTION

1. Technical Field

The present invention relates in general to water filtration and, in particular, to an improved system, method, and apparatus for filtering water dispensed by sprinkler irrigation systems and purging the filtration system.

2. Description of the Related Art

Sprinkler irrigation systems typically pump water from wells, rivers, lakes, and other open bodies of water. Typically, the water carries dirt, rust, and other debris which clog the orifices of the spray nozzles. Such clogging results in uneven water application on the field. This problem necessitates cleaning the clogged orifices by the user of the irrigation system. It would be advantageous to provide a filter that would prevent the water-borne debris from reaching the nozzles.

Overhead sprinkler irrigation systems are designed to apply a precise application of water on a field by use of nozzles that have orifices sized to a specific water volume output. There are many sizes of nozzles manufactured. It would be advantageous to provide a filter that is compatible with different types of nozzles. Since these systems may be required to operate continuously for days at a time between shutdowns, it would also be advantageous to provide storage space within the filter for an accumulation of debris.

While the prior art is replete with designs for self-cleaning shower heads, self-cleaning filters, and the like, none are entirely suitable for use on overhead sprinkler irrigation systems. The prior art devices, such as those shown in U.S. Pat. Nos. 2,770,498, and 4,717,073, typically include spray diffusers as an integral part of their design. Therefore, they are not compatible with the nozzles already in use on the systems. Additionally, there is no provision for storage of accumulated debris. Moreover, the prior art devices do not allow for passage of the larger particles of debris.

While the filtering device shown in U.S. Pat. No. 4,064,046, allows for connection to different nozzles and for storage of accumulated debris, the need to visually check and manually service it makes it undesirable. Further, the size and configuration of this device makes it impractical for use on an overhead sprinkler irrigation system. Thus, an improved design for filtering water dispensed by sprinkler irrigation systems and cleaning the filtration system would be desirable.

SUMMARY OF THE INVENTION

One embodiment of a system, method, and apparatus for a manually-flushed filter includes a hollow cylindrical body having an inlet at the upper end for connection to a drop pipe on an overhead sprinkler irrigation system. A tubular screen element is positioned within the body and removably attached at the lower end of the body. Should lime deposits accumulate over the perforations of the screen, it can be removed and cleaned. The screen element has a clean water outlet at its lower end for connection to the spray nozzle. A debris outlet is provided in the lower end of the body beside the screen element. A plunger is mounted for reciprocal movement through the debris outlet. A water hammer table is partitioned in the body and located above the plunger.

When the overhead sprinkler irrigation system is used, pressurized water flows into the body which may be manually released to flush debris that has accumulated in the body during a previous use. Manual release of the plunger allows the plunger to move downward to seat against the floor of the body sealing off the debris outlet. The pressure required to seat the plunger is significantly lower than the system operating pressure.

The water is then forced through the perforations of the screen, the clean water outlet, and the spray nozzle. Unable to pass through the perforations, the water-borne debris is held within the storage space provided by the filter's hollow body. The debris continues to accumulate until the system is shutdown or is again manually purged. The debris outlet is of sufficient size to allow particles of debris as large as ⅜ inch in size to pass therethrough. This filter is simple and durable in construction, efficient and reliable in operation, eliminates constant maintenance and servicing, and is economical in cost.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
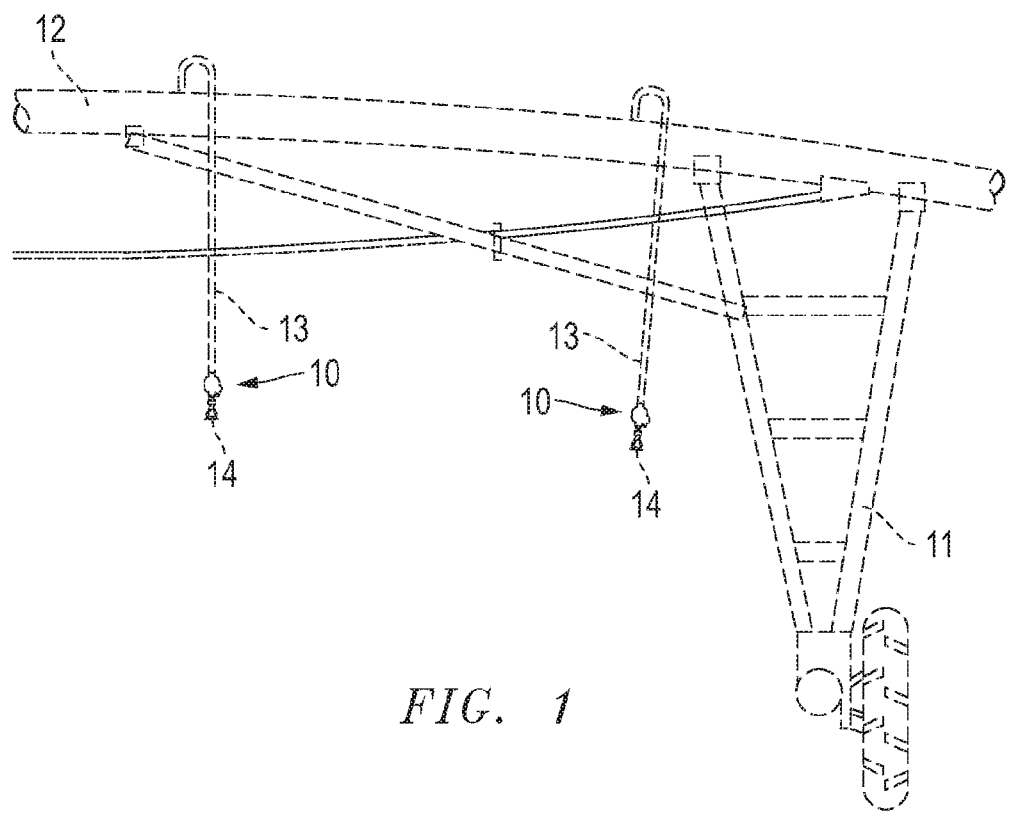
FIG. 1 is a side view of one embodiment of a filter shown installed on a section of an overhead sprinkler irrigation system and is constructed in accordance with the invention.
Figure 2:
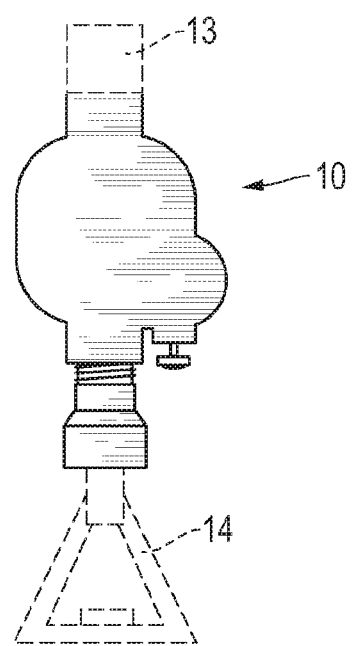
FIG. 2 is an enlarged side view of one embodiment of a filter for the system of FIG. 1 and is constructed in accordance with the invention.
Figure 3:
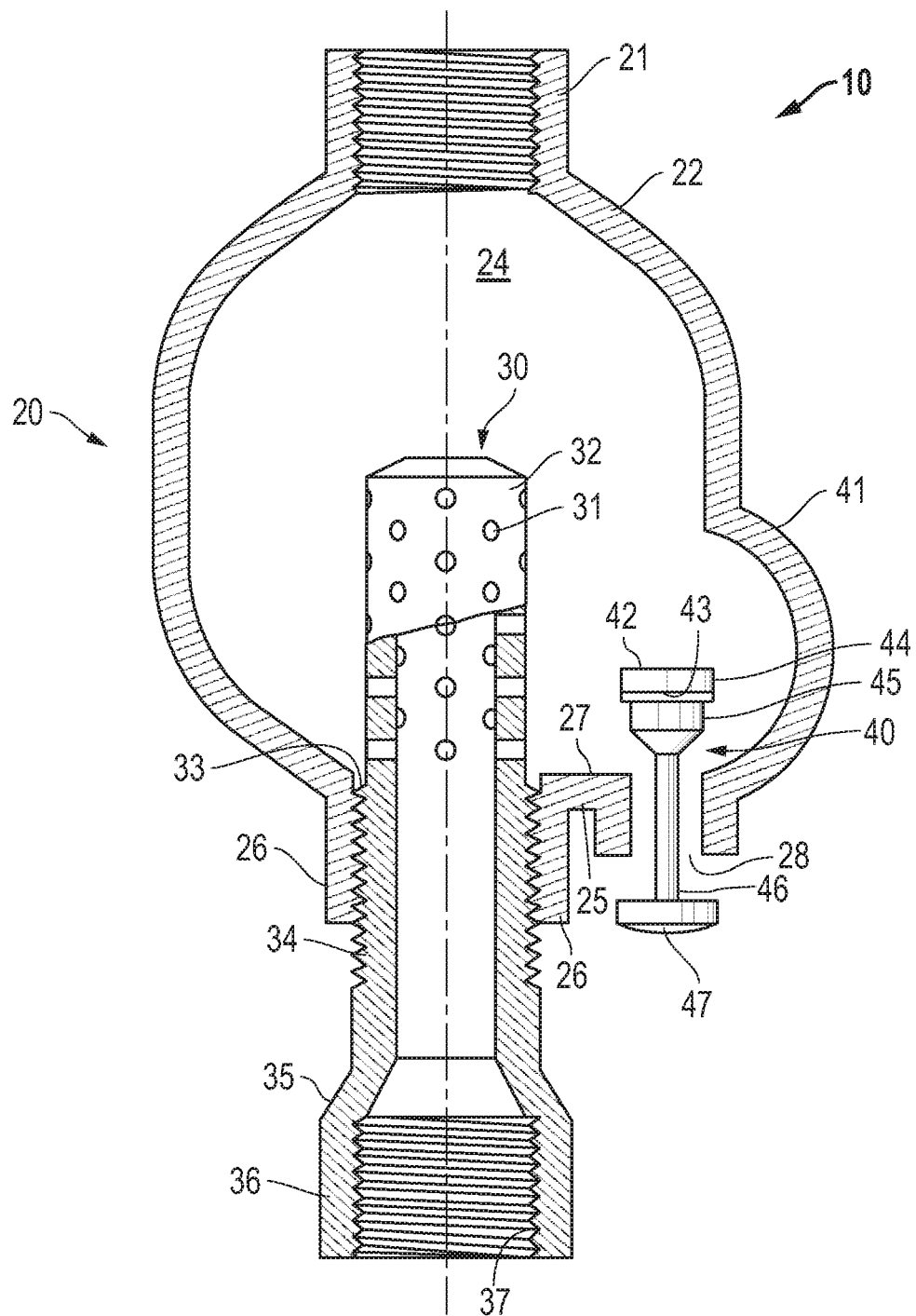
FIG. 3 is a sectional side view of the filter of FIG. 2 showing a plunger in an open position and is constructed in accordance with the invention.

Referring to FIGS. 1-3, one embodiment of the invention includes a filter 10 in one type of contemplated environment.

Specifically, the filter 10 is shown installed on a section of an overhead sprinkler irrigation system including a drive unit 11, span pipe 12, and drop pipe 13. A conventional irrigation drop spray nozzle 14, such as those known in the art, is attached to the filter 10. When the irrigation system is in use, water is pumped from one end of the system to the other through the span pipe 12, through the drop pipes 13, the filters 10, and the spray nozzles 14 for irrigating crops and the like.

Referring now to FIG. 3, one embodiment of the invention comprises a hollow, generally cylindrical body 20. At the upper end of the body 20, a neck portion or inlet 21 is provided having female threads thereon to facilitate connection to the drop pipe 13 (see FIGS. 1 and 2). The lower end of the body 20 includes two openings, including a debris outlet 28 and a coupling portion 26, which are provided through the floor 25 of the body 20. The debris outlet 28 provides a gap for the discharge of debris from the body cavity 24, as will be hereinafter described. The coupling portion 26 extends beyond the floor 25 of the body 20 and has a diameter smaller than the diameter of the body 20. The coupling portion 26 has internal female threads and is threadingly mated with the external male threads 34 of a tubular screen element 30.

The removable screen element 30 is threadingly attached to the body 20 at coupling portion 26 in a vertical position as shown. Specifically, the screen element 30 is generally tubular in shape having a closed upper end and an open lower end providing a clean water outlet 37. The screen element 30 includes an upper perforated section 32 and a lower threaded section 35. In one embodiment, the upper perforated section 32 has a plurality of perforations 31 (e.g., circular holes). The size of the perforations 31 varies in proportion to the size of the nozzle orifices on the particular irrigation system. The outside diameter of the threaded section 35 is slightly greater than the diameter of the perforated section 32. An external shoulder 33 is formed between the two sections 32 and 35. The upper end of the threaded section 35 has male threads 34 thereon and is threadingly mated with the female threads of coupling portion 26. The lower end of the threaded section 35 is outwardly flanged and downwardly extended to provide a female threaded connection 36 for attachment to a spray nozzle 14 (see FIG. 2).

A plunger 40 is positioned for reciprocal movement through debris outlet 28. Specifically, the head 45 of the plunger 40 is cylindrical and has a diameter approximately equal to the diameter of the debris outlet 28. The upper end of the head 45 is formed with a shoulder 43 which is of enlarged size relative to the head 45. The shoulder 43 serves as a support for an annular sealing gasket 44 (e.g., o-ring) and sealingly engages the internal shoulder 27 formed adjacent the debris outlet 28. The lower end of the head 45 tapers as shown, and an integrally formed stem 46 extends axially downwardly from the head 45 and passes through the debris outlet 28. A diffuser 47 is formed at the lower end of the stem 46. The diffuser 47 has a diameter greater than the diameter of the debris outlet 28. The body 20, screen element 30, and plunger 40 may be formed of a plastic material by a process such as plastic injection molding, or other desirable materials and methods.

In operation, the movable parts of the filter default to or assume a closed position unless sufficient manual upward force is exerted on diffuser 47. In the closed position, the plunger 40 seats against the internal shoulder 27 formed by the debris outlet 28. The diffuser 47 of the plunger 40 hangs downwardly from the debris outlet 28 for normal operation whereby water is discharged through clean water outlet 37.

Pressurized water is introduced into the body 20 through the inlet 21 and passes into the cavity 24 of the body. The water is limited to passing through screen element 30 when the plunger 40 is closed. In the embodiment shown, inlet 21 and screen element 30 are axially aligned. However, when the plunger 40 is manually elevated (as in FIG. 3), water exits through the larger gap formed between the plunger stem 46 and the debris outlet 28 and strikes the diffuser 47. The exiting water from debris outlet 28 flushes out any debris that may remain in the cavity 24 of the body 20 from a prior use.

When the manual upward force is released, the water strikes the diffuser 47 and the pressure area 42 on top of the plunger 40 to force the plunger downward to the closed and sealed position as before. The funnel-shaped design of the plunger head 45 serves to align and center the plunger in the debris outlet 28 during its downward movement.

The downward movement of the plunger 40 is stopped when the annular sealing gasket 44 on the plunger seats against the internal shoulder 27 formed adjacent the debris outlet 28. Thus, in the closed position, the gap at the debris outlet 28 is closed, and the water passes through the perforations 31 in the screen element 30 and exits through the clean water outlet 37. This is the filtering position. Continued water pressure within the body 20 maintains the filtering position of the elements as described.

While in the filtering position, the pressurized water passes through the perforations 31 in the screen element 30. Simultaneously, all water-borne debris that is larger than the size of the perforations 31 is held within the cavity 24 of the body 20 and accumulates until the water supply is turned off. The plunger 40 will remain in the lower, closed position when the water supply is turned off and the water pressure subsides. The large size of the diffuser 47 prevents the entire plunger 40 from being retracted into the body cavity 24. The water remaining in the irrigation system can be allowed to flow through the body 20 of the filter 10 expelling accumulated debris from the cavity 24 through the widened gap between the plunger stem 46 and the debris outlet 28. The plunger 40 is permitted lateral (sideways) play, so that the plunger stem 46 can be pushed against the edge of the debris outlet 28 by exiting water and debris. Thereby, the gap is widened further allowing larger debris to pass from the body 20.

Figure 4:
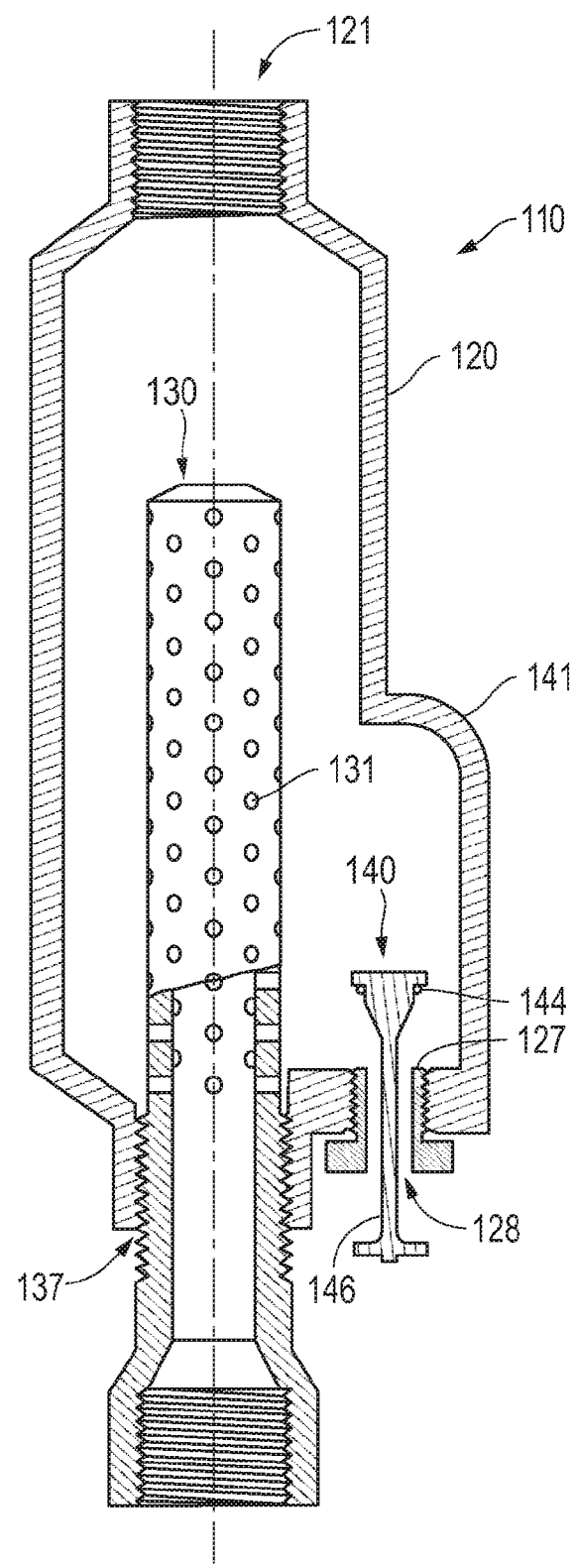
FIG. 4 is a sectional-side view of another embodiment of a filter showing a plunger in an open or purge position and is constructed in accordance with the invention.

In another embodiment (FIGS. 4 and 5), the invention comprises a filter 110 that filters water for irrigation nozzles with an elongated hollow body 120 having a fluid inlet 121 with, for example, ¾-inch female threads. Body 120 is approximately 7-inches long and has a maximum diameter of about 2.25-inches near its lower end at bulge 141. A clean water outlet 137 with ¾-inch female threads is axially aligned with and opposite the fluid inlet 121 to allow axial delivery of fluid therethrough. A debris outlet 128 is located adjacent the clean water outlet 137 and is radially spaced apart therefrom with respect to the axis. The axial alignment between inlet 121 and outlet 137 allows the unit to hang straight down during operation to facilitate a more even watering pattern than previous designs.

An elongated fluid filter 130 with ¾-inch external male threads is threadingly secured in the clean water outlet 137 for filtering water that passes therethrough and the clean water outlet 37. The filter 130 protrudes about 4-inches into the interior cavity of body 120, which is longer than earlier models. In addition, a clean out assembly comprising a plunger 140 is located in the debris outlet 128 for selectively permitting water to pass through the debris outlet 128. In one embodiment, the axial movement of the plunger 140 is accommodated by a spherical bulge 141 in body 20. In both width and depth, bulge 141 protrudes from body 20 by about ¾-inch in each direction. Bulge 141 is optional, such that body 120 may be symmetrically formed without it.

In one embodiment, the plunger 140 comprises a seal 144 on an upper end 143 for sealing against a fitting 127 threadingly mounted in the hollow body 120 at the debris outlet 128. In one embodiment, fitting 127 has ½-inch external male threads that engage and seal against ½-inch internal female threads in body 120 at the debris outlet 128. Fluid pressure is exerted on the upper end 142 of the plunger 140 to bias the plunger 140 to a closed position. The plunger 140 is manually actuated between an open position (i.e., FIG. 4, pushed upward) wherein water and debris collected inside the hollow body 120 is flushed through the debris outlet 128, and a closed position (i.e., both gravity-induced and water pressurized downward, thus a default position) wherein water is only allowed to exit the hollow body 120 through the fluid filter 130 and the clean water outlet 137. The manual purging of collected debris requires only a few seconds.

Figure 5:
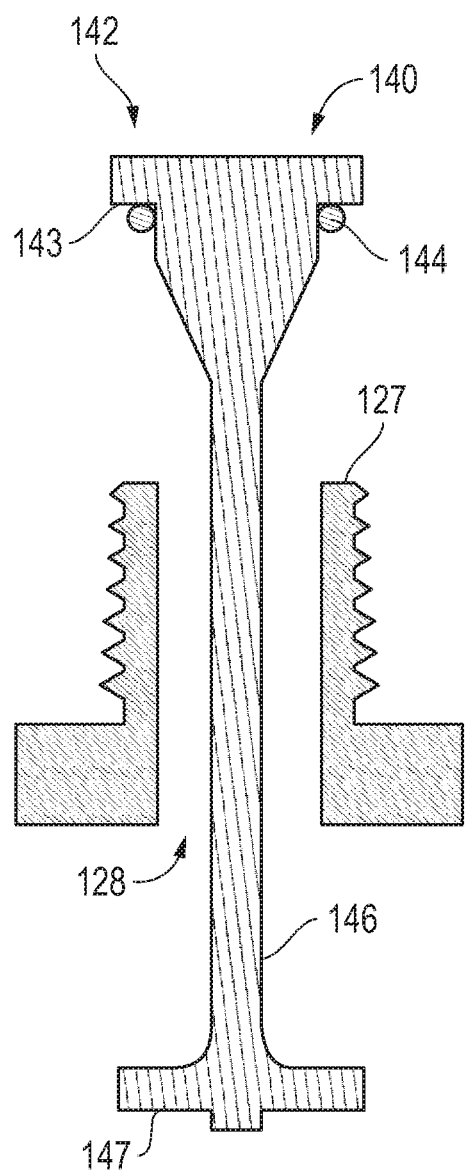
FIG. 5 is a sectional side view of one embodiment of a clean out assembly for the filter of FIG. 4 and is constructed in accordance with the invention.

In the illustrated embodiment, the plunger 140 comprises a ¼-inch diameter stem 146 and upper and lower ends 142, 147 mounted to the stem 146. As shown in FIG. 5, the stem 146 is tapered or flares radially outward at ends 142, 147 to guide the plunger with respect to respective apertures in debris outlet 128. The stem diameter is smaller than a diameter of the debris outlet 128, and the upper and lower ends 142, 147 have diameters that are greater than the diameter of the debris outlet 128. The bulge area 141 of the hollow body 120 adjacent the debris outlet 128 collects any debris from the water when the debris outlet 128 is closed. The fluid filter 130 threadingly engages the hollow body 120 at clean water outlet 137 and is removable therefrom. The hollow body 120 has an upper diameter of no more than 2 to 2.25-inches, as opposed to the 3-inch diameter of earlier models. In one embodiment, the fluid filter 130 comprises a tube with circular holes 131 having a diameter of about 1/16-inch. Other features of the filter 110 are similar to those described above for filter 10.

Figure 6:
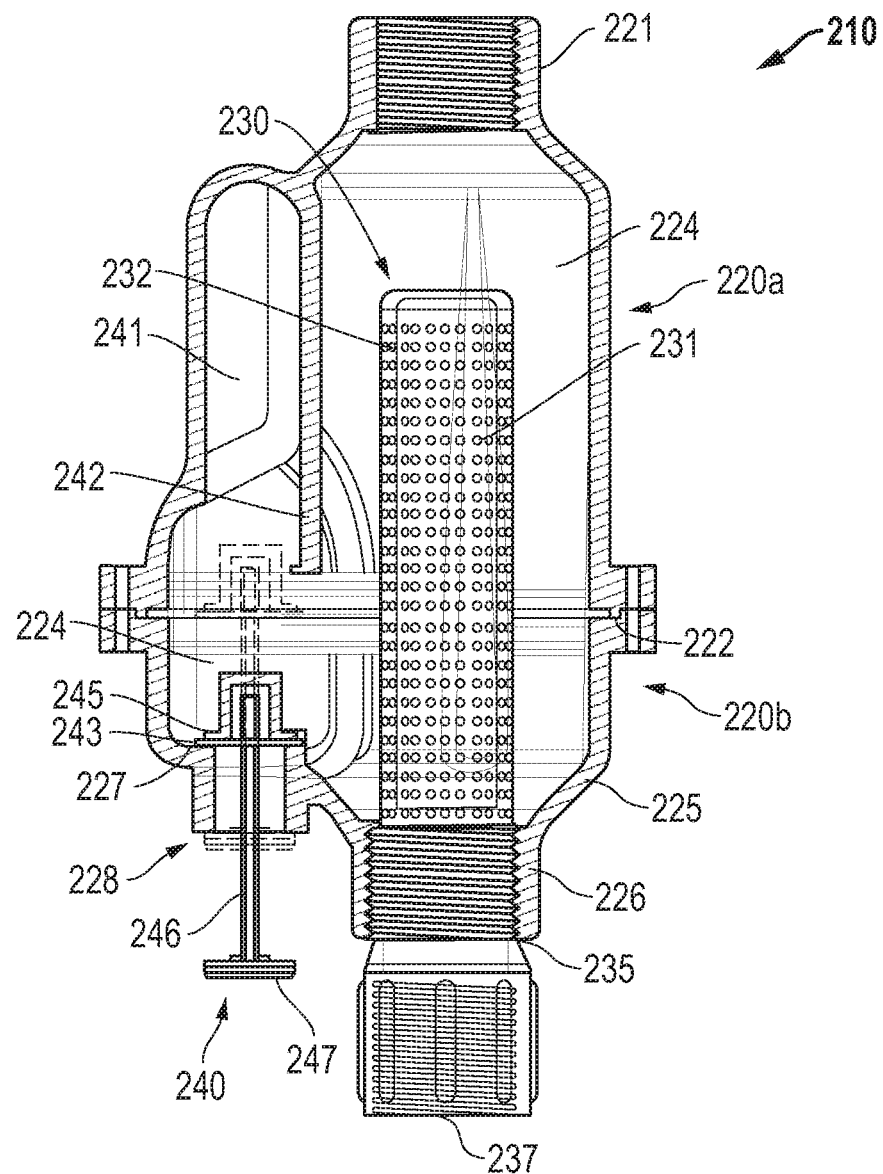
FIG. 6 is a sectional side view of another embodiment of a filter constructed in accordance with the invention.
Figure 7:
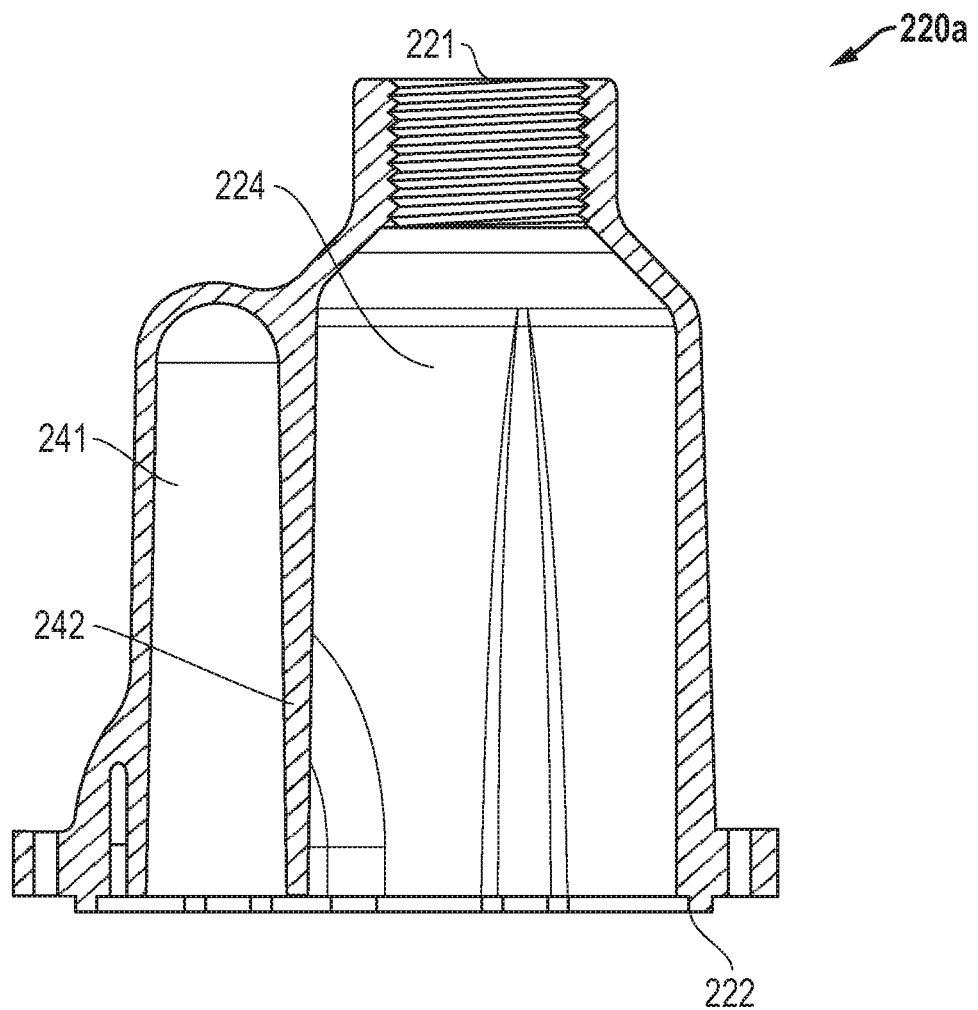
FIG. 7 depicts various views of an upper portion of the filter of FIG. 6, and is constructed in accordance with the invention.
Figure 8:
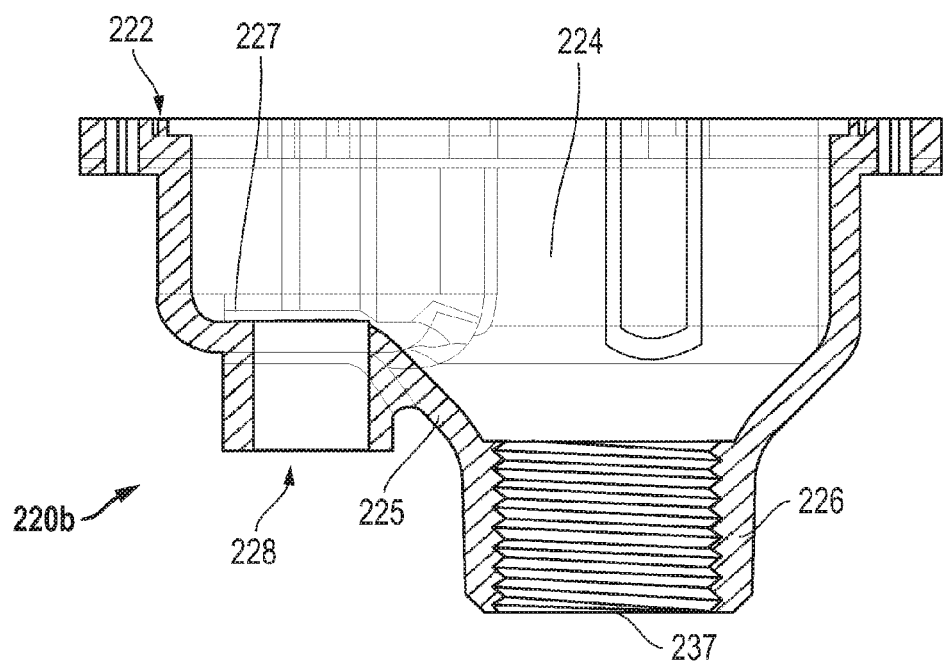
FIG. 8 depicts various views of a lower portion of the filter of FIG. 6, and is constructed in accordance with the invention.

Referring now to FIGS. 6-8, another embodiment of the invention comprises a filter 210 with hollow body 220, comprising upper and lower body portions 220a and b. At the upper end of the body 220a, a neck portion or inlet 221 is provided having female threads thereon to facilitate connection to a drop pipe. In the embodiment shown, upper and lower body portions 220a, b are joined with a self-sealing joint 222 that does not require an o-ring. The joint may comprise a tongue-in-groove joint with tapered seal surfaces that wedge against each other. After the upper and lower portions 220a, b are joined, they are secured to each other with mechanical fasteners, such as screws, as illustrated.

The lower end of the body 220b includes two openings, including a debris outlet 228 and a coupling portion 226 or clean water outlet, which are provided through the floor 225 of the body 220b. Debris outlet 228 is elevated slightly above coupling portion 226, such that floor 225 tapers downward from debris outlet 228 to coupling portion 226. The debris outlet 228 provides a gap for the discharge of debris from the body cavity 224. The debris outlet 228 extends beyond the floor 225 of the body 220b, and has a diameter smaller than the diameter of coupling portion 226. The coupling portion 226 has upper internal female threads and is threadingly mated with the external male threads 235 near a lower end of a tubular screen element 230.

The removable screen element 230 is threadingly attached to the body 220b at coupling portion 226 in a vertical position. The screen element 230 is generally tubular in shape having a closed upper end and an open lower end providing a clean water outlet 237. The clean water outlet 237 may be threadingly secured to a spray nozzle 14 as shown in FIG. 1. The screen element 230 includes an upper perforated section 232 and the threaded section 235. In one embodiment, the upper perforated section 232 has a plurality of perforations 231 (e.g., circular holes). The size of the perforations 231 varies in proportion to the size of the nozzle orifices on the particular irrigation system. The outside diameter of the threaded section 235 is slightly greater than the diameter of the perforated section 232. An external shoulder may be formed between the two sections 232 and 235. The upper end of the threaded section 235 has male threads thereon and is threadingly mated with the female threads of coupling portion 226. The lower end of the threaded section 235 may be outwardly flanged and downwardly extended to provide a female threaded connection for attachment to a spray nozzle. When filter 210 is not in use, a conventional threaded plug may be installed in place of the nozzle to prevent water leakage.

A plunger 240 is positioned for reciprocal movement though debris outlet 228. The head 245 of the plunger is a generally cylindrical cap and has a diameter that is larger than that of the debris outlet 228. The upper end of the head 245 is formed with a shoulder 243 that serves as an annular seal to engage the internal shoulder 227 formed adjacent the debris outlet 228. The lower end of the head joins to a stem 246 that extends axially downwardly from the head 245 and passes through the debris outlet 228. Stem 246 may have a cross-like shape when viewed on end. A diffuser 247 is formed at the lower end of stem 246. The diffuser 247 has a diameter greater than the diameter of the debris outlet 228 so that diffuser 247 cannot enter debris outlet 228. The body 220, screen element 230, and plunger 240 may be formed of a plastic material by a process such as plastic injection molding, or other desirable materials and methods.

In one embodiment, the axial movement of the plunger 240 is located directly below a large, hollow water hammer cavity 241. The upper portion of cavity 241 comprises a cylindrical tube, and a lower portion is more of semi-spherical bulge, in the embodiment shown. Cavity 241 is partitioned from the upper portion of main cavity 224 by wall 242, which may extend to the lower end of upper body portion 220a. As a result, an air bubble is maintained in cavity 241 at its upper end at all times, even when cavity 224 is fully pressurized with water during normal operation. The air bubble in cavity 241 forms a cushion of air to absorb shock in the filter when there is spike or surge in the water pressure. Plunger 240 does not contact wall 242. Water hammer cavity 241 has an axial length that is substantially equal to the axial length of the upper portion of cavity 224, but is smaller in diameter in the embodiment shown. Cavity 241 reduces the physical impact of and potential damage that could be caused by water pressure changes in filter 210.

In operation, the movable plunger 240 of the filter 210 defaults to or assumes a closed (or sealed) position unless sufficient manual upward force is exerted on diffuser 247. In the closed position, the plunger 240 seats on the internal shoulder 227 formed by the debris outlet 228 to form the seal. The diffuser 247 of the plunger 240 hangs downwardly from the debris outlet 228 for normal operation whereby water is discharged only through clean water outlet 237.

Pressurized water is introduced into the body 220 through the inlet 221 and passes into the cavity 224 and a lower portion of cavity 241, such that an air bubble is maintained in its upper end at all times. During normal operation, the only water discharge by filter 210 is limited to passing through screen element 230 when the plunger 240 is closed. In the embodiment shown, inlet 221 and screen element 230 are axially aligned. However, when the plunger 240 is manually elevated, water also exits through the gap formed between the plunger stem 246 and the debris outlet 228 and strikes the diffuser 247 as it exits filter 210. The exiting water from debris outlet 228 flushes out any debris that may remain in the cavity 224 of the body 220 from a prior use, and which was too large to pass through perforations 231.

When the manual upward force is released, the water strikes the diffuser 247 and the pressure area on top of the plunger 240 to force the plunger downward to the closed and sealed position as before. The design of the plunger serves to align and center the plunger in the debris outlet during its downward movement. The downward movement of the plunger 240 is stopped when the plunger head seats against the internal shoulder 227 formed adjacent the debris outlet 228. Thus, in the closed position, the gap at the debris outlet 228 is closed, and the water passes through the perforations 231 in the screen element 230 and exits through the clean water outlet 237. This is the filtering position. Continued water pressure within the body 220 maintains the filtering position of the elements as described.

While in the filtering position, the pressurized water passes through the perforations 231 in the screen element 230. Simultaneously, all water-borne debris that is larger than the size of the perforations 231 is held within the cavity 224 of the body 220 and accumulates until the water supply is turned off. The plunger 240 remains in the lower, closed position when the water supply is turned off and the water pressure subsides. The large size of the diffuser 247 prevents the entire plunger 240 from being retracted into the body. The water remaining in the irrigation system can be allowed to flow through the body of the filter expelling accumulated debris from the cavity through the gap between the plunger stem 246 and the debris outlet 228. The plunger 240 is permitted some lateral (sideways) play, so that the plunger stem 246 can be pushed against the edge of the debris outlet 228 by exiting water and debris. Thereby, the gap is widened further allowing larger debris to pass from the body.

While particular embodiments of this invention are disclosed, it is understood that various changes, substitutions of equivalents, and other alterations can be made without departing from the spirit and scope of the invention. Further, while the application of the invention cited herein has been to overhead sprinkler irrigation systems, it shall not be limited to such use. Therefore, the scope of the invention should be determined by the appended claims.

We claim:

1. A system for filtering water for irrigation nozzles, comprising:
    a body having a cavity with an axis, a fluid inlet, a clean water outlet to allow delivery of fluid therethrough, and a debris outlet adjacent the clean water outlet and spaced apart therefrom;
    a fluid filter located in the clean water outlet for filtering water that passes therethrough and the clean water outlet;
    a plunger located in and movable relative to the debris outlet for selectively permitting water and debris to pass through the debris outlet;
    a water hammer cavity defined by part of the body and partitioned from the cavity such that an air bubble forms in an upper end thereof for forming a cushion of air to absorb shock in the body when there is a spike in water pressure in the body; and
    the water hammer cavity comprises an upper portion formed as a cylindrical tube, and a lower portion formed as a semi-spherical bulge.

2. A system according to claim 1, wherein the body comprises upper and lower body portions that are joined with a self-sealing joint that does not require an o-ring, and the part of the body that defines the water hammer cavity protrudes outward from the body.

3. A system according to claim 2, wherein the self-sealing joint comprises a tongue-in-groove joint with tapered seal surfaces that wedge against each other, and the upper and lower portions are secured to each other with mechanical fasteners.

4. A system according to claim 1, wherein the debris outlet is elevated slightly above the clean water outlet, such that a floor of the body tapers downward from the debris outlet to the clean water outlet.

5. A system according to claim 1, wherein the plunger has a cap and a shoulder to form an annular seal that engages an internal shoulder formed adjacent the debris outlet, the plunger also having a stem that extends axially downwardly from the cap, and the body is adapted to contact the air bubble at an upper end of the water hammer cavity.

6. A system according to claim 1, wherein the water hammer cavity has an axial length that is substantially equal to an axial length of the cavity, but smaller in diameter, and the water hammer cavity is defined by an interior surface of the body.

7. A water filter for filtering water in irrigation systems, comprising:
    a body having a cavity with an axis, a fluid inlet, a clean water outlet that is axially aligned with and opposite the fluid inlet to allow axial delivery of fluid therethrough, and a debris outlet adjacent the clean water outlet and radially spaced apart from the axis;
    a fluid filter mounted to the clean water outlet and having holes for allowing water to pass through the fluid filter to the clean water outlet;
    a clean out assembly mounted in the debris outlet and having a plunger that is movable between a closed position for sealing the debris outlet in a default position, and an open position for passing water and debris through the debris outlet; and
    a water hammer cavity in the body and partially partitioned from the cavity by a wall extending as part of the body itself between the water hammer cavity and the cavity, such that fluid communication is maintained between the water hammer cavity and the cavity, and such that an air bubble forms in an upper end of the water hammer cavity for forming a cushion of air to absorb shock in the body when there is spike in water pressure in the body.

8. A water filter according to claim 7, wherein the body comprises upper and lower body portions that are joined with a self-sealing joint that does not require an o-ring, and the water hammer cavity is defined by the body.

9. A water filter according to claim 8, wherein the self-sealing joint comprises a tongue-in-groove joint with tapered seal surfaces that wedge against each other, and the upper and lower portions are secured to each other with mechanical fasteners.

10. A water filter according to claim 7, wherein the debris outlet is elevated slightly above the clean water outlet, such that a floor of the body tapers downward from the debris outlet to the clean water outlet.

11. A water filter according to claim 7, wherein the plunger a cap and has a wedged shoulder that serves as an annular seal to engage an internal shoulder formed adjacent the debris outlet, the plunger also having a stem that extends axially downwardly from the cap, and the body includes an outward protrusion for accommodating the water hammer cavity.

12. A water filter according to claim 7, wherein the water hammer cavity comprises an upper portion formed as a cylindrical tube, and a lower portion formed as a semi-spherical bulge.

13. A water filter according to claim 7, wherein the water hammer cavity has an axial length that is substantially equal to an axial length of the cavity, but smaller in diameter, and the body is adapted to contact the air bubble at an upper end of the water hammer cavity.

14. A water filter for filtering water in irrigation systems, comprising:
- a body having a cavity with an axis, a fluid inlet, a clean water outlet, and a debris outlet;
- a fluid filter mounted to the clean water outlet and having holes adapted to allow water to pass therethrough to the clean water outlet;
- a clean out assembly mounted in the debris outlet and having a plunger that is movable between a closed position for sealing the debris outlet in a default position, and an open position for passing water and debris through the debris outlet; and
- a water hammer cavity defined only by the body itself adjacent the cavity, such that fluid communication is maintained between the cavity and the water hammer cavity, and the water hammer cavity is adapted to contain an air bubble in an upper end thereof for forming a cushion of air to absorb shock in the body when there is spike in water pressure in the body.

15. A water filter according to claim 14, wherein the water hammer cavity is partially partitioned from the cavity by a wall extending from the body itself therebetween.

16. A water filter according to claim 14, wherein the body includes a protrusion extending radially outward relative to an exterior of the body for accommodating the water hammer cavity.

17. A water filter according to claim 14, wherein the water hammer cavity is defined only by an interior surface of the body, such that only the interior surface of body is adapted to contact the air bubble at an upper end of the water hammer cavity.

* * * * *